(12) United States Patent
Niendorf et al.

(10) Patent No.: US 6,895,818 B2
(45) Date of Patent: May 24, 2005

(54) DIFFERENTIAL IN-PLANE TUNNELING CURRENT SENSOR

(75) Inventors: Andreas Niendorf, Berlin (DE); Wilhelm Frey, Mountain View, CA (US); Zhiyu Pan, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/327,273

(22) Filed: Dec. 20, 2002

(65) Prior Publication Data

US 2004/0118207 A1 Jun. 24, 2004

(51) Int. Cl.$^7$ ............................................... G01P 15/08
(52) U.S. Cl. ............................... 73/514.18; 73/514.02; 73/510; 73/514.16
(58) Field of Search .................... 73/514.18, 514.24, 73/514.16, 514.38, 514.25, 514.02, 510

(56) References Cited

U.S. PATENT DOCUMENTS 5,290,102 A * 3/1994 Kaiser et al. ............ 250/338.1
5,563,344 A * 10/1996 Kaiser et al. ............ 73/514.24
5,763,782 A * 6/1998 Moore et al. ............ 73/514.18

OTHER PUBLICATIONS

* E. Boyden et al, "A High–Performance Tunneling Accelerometer" MIT Term Project Paper 6.777, Introduction to Microelectromechanical Systems, Spring 1999.
* Chingwen Yeh, "A Low Voltage Tunneling–based Silicon Microaccelerometer", University Of Michigan Research Project Paper, (undated).
C. Yeh and K. Najafi, "A Low–Voltage Bulk–Silicon Tunneling–Based Microacceleraometer," *Technical Digest, IEEE Int. Electron Devices Meeting (IEDM)*, Washington, D.C., pp. 593–596, Dec. 1995.

C. Yeh and K. Najafi, "A Low–Voltage Tunneling–Based Silicon Microaccelerometer," *IEEE Trans. Electron Devices*, vol. 44, No. 11, pp. 1875–1882, Nov. 1997.
C. Yeh and Najafi, "Micromachined Tunneling Accelerometer with a Low–Voltage CMOS Interface Circuit," *Proc. Int. Conf. On Solid–State Sensors and Actuators,Transducers '97*, Chicago, pp. 1213–1216, Jun. 1997.
D.T. Cahng et al., "New Fabrication Techniques for High Dynamic Range Tunneling Sensors," Micromachined Devices and Components VI, Proceedings of SPIE vol. 4176 (2000).
D. Dilella et al., "A micromachined magnetic–field sensor based on an electron tunneling displacement transducer," Sensors and Actuators 86 (2000).
Edward Boyden, Osamah El Rifai, Brian Hubert, Maurice Karpman, Dae Roberts, "A High–Performance Tunneling Accelerometer" Term Project, 6.777, Introduction to Microelectromechanical Systems, Spring 1999, URL: http://www.eecs.umich.edu/najafi/doc/Project 4d.doc.

* cited by examiner

*Primary Examiner*—John E. Chapman
(74) *Attorney, Agent, or Firm*—Kenyon & Kenyon

(57) ABSTRACT

A sensor arrangement for measuring a displacement of a proof mass using a tunneling current includes a proof mass body suspended by micro-mechanical beams to permit a mass body movement, at least one integrated electrode tip arranged to be integrated with the proof mass body, and at least one external electrode tip arranged externally to the proof mass body and suspended by micro-mechanical beams to permit an external electrode movement, the at least one external electrode tip further arranged to be in a close proximity to the at least one integrated electrode tip to permit a flow of the tunneling current between the at least one external electrode tip and the at least one integrated electrode tip, in which the displacement of the proof mass causes a change in the tunneling current.

22 Claims, 5 Drawing Sheets

DIFFERENTIAL IN-PLANE TUNNELING CURRENT SENSOR

FIELD OF THE INVENTION

The present invention concerns a tunneling current sensor arrangement and method to measure a small displacement of a proof mass due to, for example, a linear and/or angular external acceleration.

BACKGROUND INFORMATION

Tunneling sensors may use a bias voltage applied between an electrode tip and a conducting sample. When the tip and the sample are brought to within a few Angstroms (Å) of each other, a tunneling current may flow due to quantum mechanical tunneling effects. Because the tunneling current may depend exponentially on the separation between the electrode tip and the conducting sample, the distance between the electrode tip and the conducting sample may be measured to within, for example, $10^{-3}$ (Å).

E. Boyden et al., "A High-Performance Tunneling Accelerometer" MIT Term Project Paper 6.777, Introduction to Microelectromechanical Systems, Spring 1999, discusses a tunneling sensor based on an at least two-layer structural configuration, i.e. adjacent electrode tips are located in different wafer layers, which may complicate the manufacture process and involve higher cost. If made from silicon, for example, microelectromechanical tunneling sensors may require a metal contact since the native oxide of silicon may be too thick to allow tunneling. (The native oxide results when silicon is exposed to air, thereby forming an insulator layer that prevents the flow of tunnel current). Furthermore, such a multi-layer structural configuration may require a separate proof mass for each dimension measured by the sensor—for example: one proof mass for a one-dimensional sensor (a linear accelerometer) or two proof masses for a two-dimensional sensor (an angular accelerometer) or three proof masses for a three-dimensional sensor (a gyroscope).

A tunneling current sensor fabricated using bulk silicon micro-machining technology and a boron etch-stop dissolved wafer process is discussed in Chingwen Yeh, "A Low Voltage Tunneling-based Silicon Microaccelerometer", University of Michigan Research Project Paper. Such a tunneling current sensor may likewise be difficult and costly to manufacture, as well as require multiple proof masses for two- and three-dimensional measuring devices.

SUMMARY OF THE INVENTION

An exemplary embodiment of the present invention concerns a tunneling current sensor to measure a small displacement of a proof mass caused by, for example, a linear and/or angular external acceleration. Unlike sensors based on bulk microelectromechanical system technology (MEMS), which may use more than one wafer stack to form the sensor device, an exemplary tunneling current sensor may use surface microelectromechanical system technology to provide a simple and less expensive tunneling current sensor capable of detecting accelerations in more than one dimension.

By using electrode tips arranged within one structural layer as may be possible in a surface microelectromechanical system device, the exemplary tunneling current sensor may sense an in-plane movement of its associated proof mass. In particular, one or more electrode tips of the exemplary tunneling current sensor may be arranged "in-plane" and may be attached at the end of a micromechanical beam or at the middle of the proof mass. During operation, an electrode tip may be deflected by electrostatic forces towards a substrate until tunneling occurs at the electrode tip. If an external acceleration is applied to the proof mass, the beam or membrane may bend and change the distance between adjacent electrode tips and/or the substrate, which results in a varying tunnel current. If a feedback force is used to keep the electrode tip at a constant distance with respect to an adjacent electrode, the voltage between the beam or membrane and the substrate may be adjusted accordingly and may be used as an output signal.

It is believed that in-plane realization of the electrode tips obtained using the feedback force should allow use of low cost standard microelectromechanical system (MEMS) processes. For example, an exemplary in-plane tunneling current sensor implemented within one structural layer may be realized using a two layer microelectromechanical process (such as, for example, a poly-silicon structural layer forming the proof mass and a metal coating forming the electrode tips). To overcome the native oxide problem of silicon or polysilicon, the exemplary in-plane tunneling current sensor may be packaged with inert gases or sealed in a vacuum, and/or the electrode tips may be covered with an appropriate material (such as, for example, gold or even a conductive organic material), and/or the structural layer may include the use of other materials, such as SiGe, SiC or diamond.

An exemplary in-plane tunneling current sensor may exhibit a high sensitivity characteristic. With the expected decreasing size of microelectromechanical systems (MEMS) devices, it may become necessary to measure much smaller displacements. Since a tunnel current may not depend on the size of the microelectromechanical system (MEMS) device (as compared, for example, to capacitance measurements), this may allow higher resolution and higher sensitivity.

An exemplary in-plane tunneling current sensor may also include a differential layout configuration to increase the overall performance. A differential layout configuration may offer the benefits of low long term drift (variation of the output signal due to changes in temperature, humidity, etc.) and a small offset. Furthermore, a differential layout configuration may also increase the range of application of such sensors.

An exemplary in-plane tunneling current sensor may also include an arrangement to enhance the protection of electrode tips for increasing the robustness, sensitivity, and measuring range of the sensor (effectively expanding the range of application and reducing the cost of packaging). Such enhanced protection may be provided, for example, by using an additional actuator.

An exemplary embodiment of the present invention is directed to providing a sensor arrangement for measuring a displacement of a proof mass using a tunneling current having a proof mass body suspended by micro-mechanical beams to permit a mass body movement, at least one integrated electrode tip arranged to be integrated with the proof mass body, and at least one external electrode tip arranged externally to the proof mass body and suspended by micro-mechanical beams to permit an external electrode movement, the at least one external electrode tip further arranged to be in a close proximity to the at least one integrated electrode tip to permit a flow of the tunneling current between the at least one external electrode tip and the at least one integrated electrode tip, wherein the displacement of the proof mass causes a change in the tunneling current.

Yet another exemplary embodiment is directed to a sensor arrangement in which the at least one integrated electrode tip and the at least one external electrode tip are arranged to be an in-plane configuration.

Still another exemplary embodiment is directed to a sensor arrangement in which the proof mass body, the at least one integrated electrode tip, and at least one external electrode tip are arranged to be in one structural layer of a microelectromechanical device.

Yet another exemplary embodiment is directed to a sensor arrangement in which the displacement results from a linear acceleration.

Still another exemplary embodiment is directed to a sensor arrangement in which the displacement results from an angular acceleration.

Yet another exemplary embodiment is directed to a sensor arrangement in which the displacement results from both a liner and an angular acceleration.

Still another exemplary embodiment is directed to a sensor arrangement in which the sensor arrangement is used to measure a yaw rate.

Yet another exemplary embodiment is directed to a sensor arrangement in which the mass body movement remains constant and the external electrode movement varies.

Still another exemplary embodiment is directed to a sensor arrangement in which the mass body movement varies and the external electrode movement remains constant.

Yet another exemplary embodiment is directed to a sensor arrangement in which the mass body movement varies and the external electrode movement varies.

Still another exemplary embodiment is directed to a sensor arrangement in which a gap between the at least one integrated electrode tip and the at least one external electrode tip remains constant.

Yet another exemplary embodiment is directed to a sensor arrangement having at least one amplifier coupled to the at least one external electrode tip.

Still another exemplary embodiment is directed to a sensor arrangement having a dc supply coupled to the proof mass body.

Yet another exemplary embodiment is directed to a sensor arrangement in which the at least one integrated electrode tip includes a first integrated tip and a second integrated tip, and the at least one external electrode tip includes a first external tip arranged in close proximity to the first integrated tip and a second external tip arranged in close proximity to the second integrated tip.

Still another exemplary embodiment is directed to a sensor arrangement in which the first integrated tip is arranged opposite to the second integrated tip.

Yet another exemplary embodiment is directed to a sensor arrangement in which the first integrated tip is arranged parallel to the second integrated tip.

Still another exemplary embodiment is directed to a sensor arrangement in which the at least one integrated electrode tip further includes a third integrated tip and a fourth integrated tip, and the at least one external electrode tip further includes a third external tip arranged in close proximity to the third integrated tip and a fourth external tip arranged in close proximity to the fourth integrated tip.

Yet another exemplary embodiment is directed to a sensor arrangement in which the first integrated tip is arranged opposite to the second integrated tip and the third integrated tip is arranged opposite to the fourth integrated tip.

Still another exemplary embodiment is directed to a sensor arrangement in which the at least one integrated electrode tip further includes a fifth integrated tip and a sixth integrated tip, and the at least one external electrode tip further includes a fifth external tip arranged in close proximity to the fifth integrated tip and a sixth external tip arranged in close proximity to the sixth integrated tip.

Yet another exemplary embodiment is directed to a sensor arrangement in which the first integrated tip is arranged opposite to the second integrated tip and parallel to the third integrated tip, the third integrated tip is arranged opposite to the fourth integrated tip and parallel to the second integrated tip, and the fifth integrated tip is arranged opposite to the sixth integrated tip.

Still another exemplary embodiment is directed to a protecting arrangement to protect electrode tips of a micromechanical device, the protecting arrangement having a first electrode tip, a second electrode tip arranged opposite to the first electrode tip, a first actuator arranged to move the first electrode tip in a forward direction toward the second electrode tip, a second actuator arranged to move the first electrode tip in a backward direction away from the second electrode tip, and a detection arrangement to detect a sudden increase in a tunnel current flowing between the first electrode tip and the second electrode tip, the sudden increase in the tunnel current indicating an impending collision between the first electrode tip and the second electrode tip.

Yet another exemplary embodiment is directed to a protecting arrangement in which the detecting arrangement includes a feedback loop configuration.

DETAILED DESCRIPTION

Figure 1:
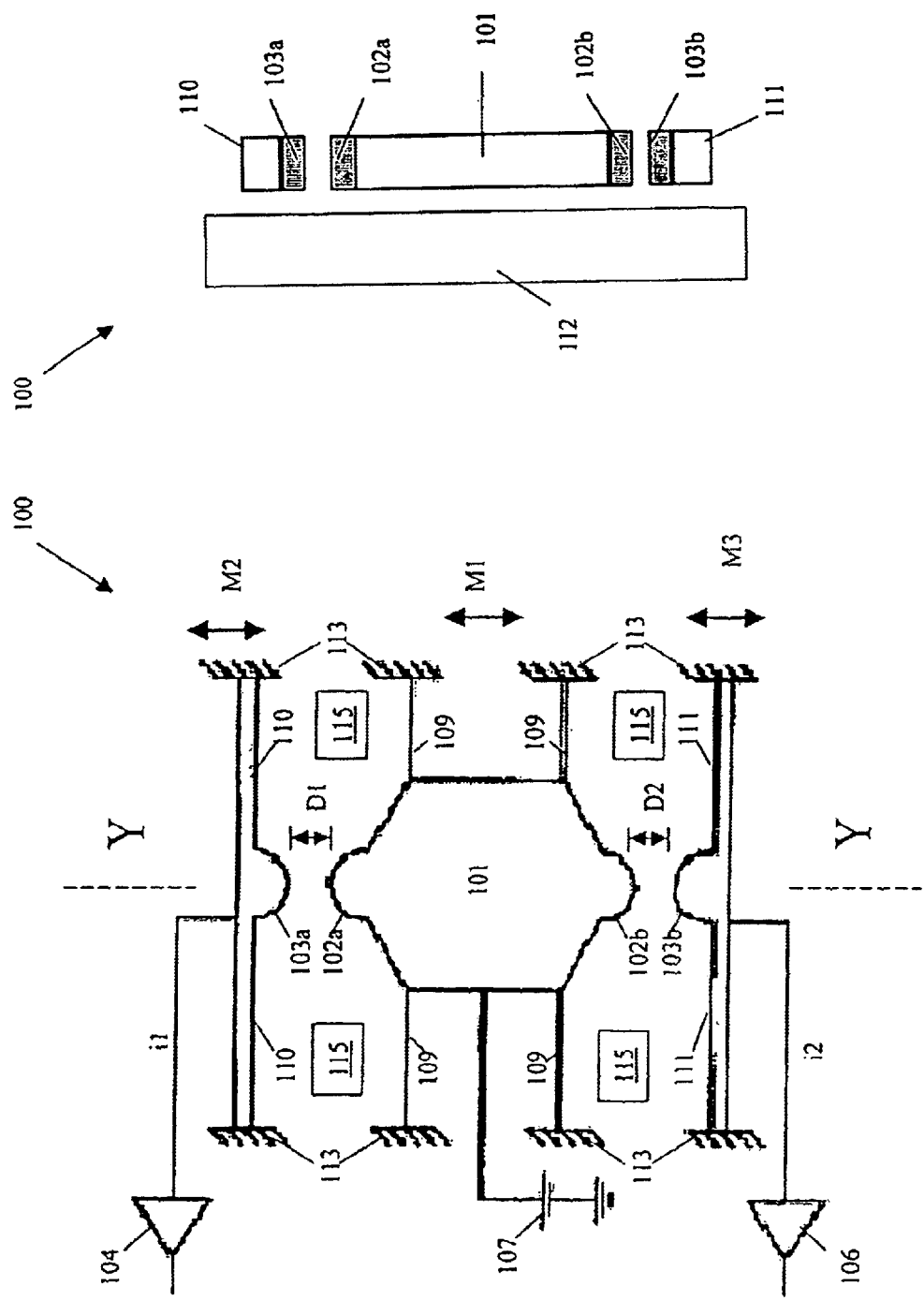
FIG. 1A shows an exemplary in-plane tunneling current sensor arrangement.
FIG. 1B shows the exemplary in-plane tunneling current sensor arrangement of FIG. 1 in a side view.

FIGS. 1A and 1B show an in-plane tunneling current sensor arrangement 100 for measuring small displacements of a proof mass 101. FIG. 1 shows the arrangement 100 in a top view and FIG. 1B shows the arrangement 100 in a side view along axis Y. The in-plane tunneling current sensor arrangement 100 includes a proof mass body 101, two integrated electrode tips 102a, 102b, two external electrode tips 103a, 103b, two amplifiers 104, 106, a dc supply source 107, and an underlying substrate 112. The two integrated electrode tips 102a, 102b are arranged to be integrated with the proof mass 101 and face opposite each other. The two external electrode tips 103a, 103b are arranged externally to the proof mass 101 and in close proximity to the integrated electrode tips 102a, 102b (that is, external electrode tip 103a is arranged to be in close proximity to integrated electrode tip 102a and external electrode tip 103b is arranged to be in close proximity to integrated electrode tip 102b, e.g. less than 1 μm). The two amplifiers 104, 106 are coupled to the two external electrode tips 103a, 103b (that is, amplifier 104 is coupled to external electrode tip 103a and amplifier 106 is coupled to external electrode tip 103b). The dc supply 107 is coupled to the proof mass body 101.

The proof mass body 101, external electrode tip 103a, and external electrode tip 103b are suspended by one or more micromechanical beams and are therefore movable. In particular, proof mass body 101 is suspended by beams 109 permitting movement M1, external tip 103a is suspended by beams 110 permitting movement M2, and external tip 103b is suspended by beams 111 permitting movement M3. The beams 109, 110, and 111 are anchored to substrate 112 by attachment points 113.

A dc voltage from dc voltage supply 107 biases proof mass 101 to cause a tunneling current to flow between the electrode tips. In particular, the dc voltage from dc voltage supply 107 biasing proof mass 101 causes a tunnel current i1 to flow between integrated electrode tip 102a and external electrode tip 103a, and also causes a tunnel current i2 to flow between integrated electrode tip 102b and external electrode tip 103b. The tunneling current between the electrode tips is amplified via amplifiers 104, 106, which are coupled respectively to the external electrode tips 103a, 103b. In particular, tunnel current i1 is amplified by amplifier 104 and tunnel current i2 is amplified by amplifier 106.

After fabrication of the tunneling current sensor, the gap D1 between integrated electrode tip 102a and corresponding external electrode tip 103a, as well as the gap D2 between integrated electrode tip 102b and corresponding external electrode tip 103b, may be too large to allow tunneling. Therefore external electrode tip 103a may be moved towards integrated electrode tip 102a until tunneling occurs. Likewise, external electrode tip 103b may be moved towards integrated electrode tip 102b. The external electrode tips 103a and 103b may be moved by a MEMS actuator 115 (such as, for example, an electrostatic, magnetic, piezo- or thermoelectric MEMS actuator).

The in-plane tunneling current sensor arrangement 100 permits the measurement of very small displacements of the proof mass 101. For example, if the proof mass 101 is displaced (such as, for example, due to an external acceleration), the gaps D1 and D2 may change. In particular, gap D1 may decrease while gap D2 increases, or gap D1 may increase while gap D2 decreases. The change in gaps D1 and D2 lead to a differential change in the measured tunnel currents i1 and i2. In particular, a decrease in gap size leads to an increase in the corresponding tunnel current, and an increase in gap size leads to a reduction in the corresponding tunnel current. Thus, for example, if proof mass 101 is displaced causing gap D1 to increase and gap D2 to decrease, then the tunnel current i1 corresponding to gap D1 decreases while the tunnel current i2 corresponding to gap D2 increases. Likewise, if proof mass 101 is displaced in an opposite direction causing gap D1 to decrease and gap D2 to increase, then the tunnel current i1 corresponding to gap D1 increases while the tunnel current i2 corresponding to gap D2 decreases.

Using a force feedback approach, the performance of the in-plane tunneling current sensor arrangement 100 may be enhanced. In this case the distance between the electrode tips is held constant so that the gaps D1 and D2 remain constant (neither increasing nor decreasing). This linearizes the dependence of the displacement and the tunnel current. To measure the displacement of the proof mass 101, the external electrode tips 103a and 103b are configured to follow the movement M1 of the mass 101. The necessary force applied to maintain a constant distance between electrode tips is a measure of the displacement of the proof mass 101.

Alternatively, if the proof mass 101 is deflected by an external acceleration, the proof mass 101 itself may be held in position using, for example, the MEMS actuator 115. A change in a measured tunnel current, either tunnel current i1 or tunnel current i2, is used to generate a force to hold the proof mass 101 in its position. The generated force required to hold the proof mass 101 in its position is a value of the external acceleration. As a result, the gaps D1 and D2 effectively remain constant.

Figure 2:
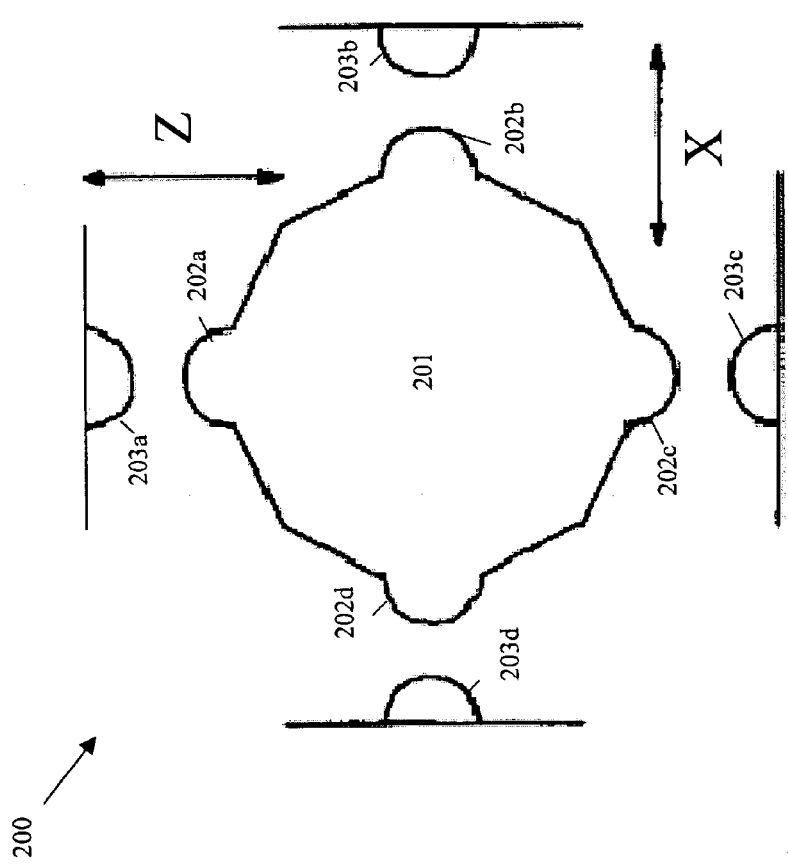
FIG. 2 shows an exemplary two-dimensional in-plane tunneling current sensor arrangement.

FIG. 2 shows a two-dimensional in-plane tunneling current sensor arrangement 200 for measuring a small two-dimensional displacement of a proof mass 201. Two-dimensional in-plane tunneling sensor arrangement 200 includes a proof mass body 201, four integrated electrode tips 202a–d, and four surrounding external electrode tips 203a–d. The four integrated electrode tips 202a–d are arranged to be integrated with the proof mass body 201 and face opposite each other in pairs (that is, integrated electrode tips 202a and 202c form one pair that face opposite each other while integrated electrode tips 202b and 202d form another pair that face opposite each other). The four surrounding external electrode tips 203a–d are arranged externally to the proof mass body 201 and in close proximity to the four integrated electrode tips 202a–d (that is, external electrode tip 203a is arranged to be in close proximity to integrated electrode tip 202a; external electrode tip 203b is arranged to be in close proximity to integrated electrode tip 202b; external electrode tip 203c is arranged to be in close proximity to integrated electrode tip 202c; and external electrode tip 203d is arranged to be in close proximity to integrated electrode tip 202d).

During operation, the proof mass body 201 remains steadfast in its position, and the surrounding external electrode tips 203 are arranged to move in either a horizontal direction X or in a vertical direction Z. In particular, the external electrode tips 203b and 203d are arranged to move in the horizontal direction X, and the external electrode tips 203a and 203c are arranged to move in the vertical direction Z.

Figure 3B:
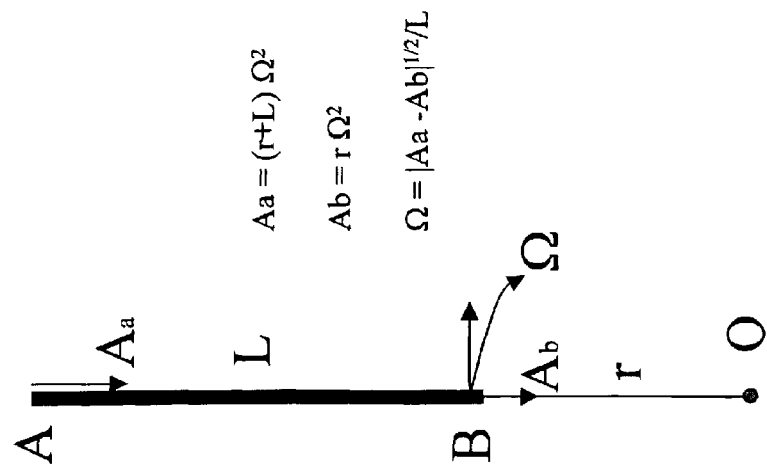
FIG. 3B shows an exemplary application of the exemplary rotation-sensing in-plane tunneling current sensor arrangement of FIG. 3A to measure a yaw rate.
Figure 3A:
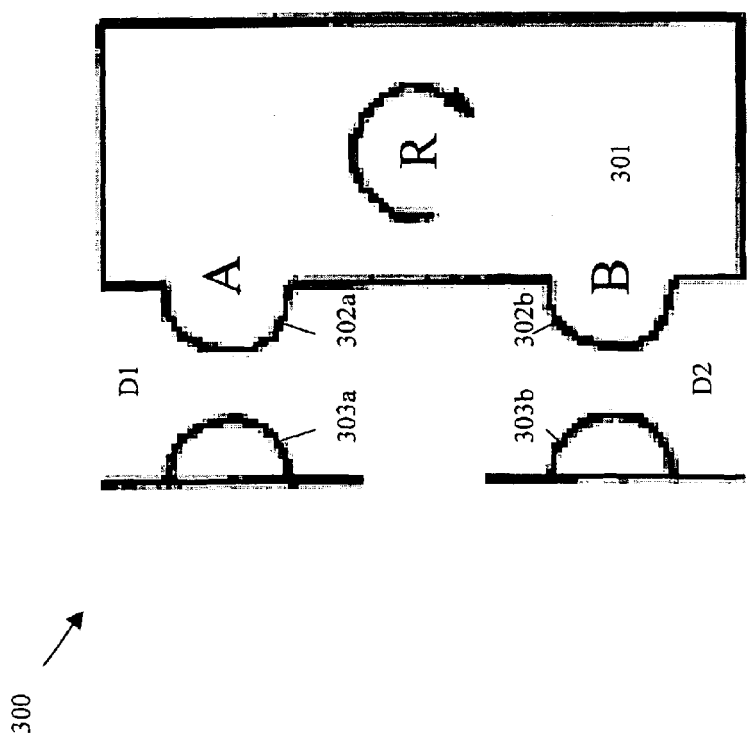
FIG. 3A shows an exemplary rotation-sensing in-plane tunneling current sensor arrangement.

FIG. 3A shows a rotation-sensing in-plane tunneling current sensor arrangement 300 to measure angular acceleration of a proof mass 301. The rotation-sensing in-plane tunneling current sensor arrangement 300 includes a proof mass body 301, two integrated electrode tips 302a, 302b and two external electrode tips 303a, 303b. The two integrated electrode tips 302a, 302b are arranged to be integrated with the proof mass body 301 and parallel to each other. The two external electrode tips 303a, 303b are arranged externally to the proof mass body 310 and in close proximity to the two integrated electrode tips 302a, 302b. In particular, external electrode tip 303a is arranged in close proximity to integrated electrode tip 302a, and external electrode tip 303b is arranged in close proximity to integrated electrode tip 302b.

Due to a clockwise rotation R of the proof mass body 301, the gap D1 between integrated electrode tip 302a and external electrode tip 303a decreases, and the gap D2 between integrated electrode tip 302b and external electrode tip 303b increases. The decrease in gap D1 between integrated electrode tip 302a and external electrode tip 303a causes a change in a corresponding tunnel current associated with electrode tips 302a and 303a. Likewise, the increase in gap D2 between integrated electrode tip 302b and external electrode tip 303b causes a change in a corresponding tunnel current associated with electrode tips 302b and 303b. The difference between the tunnel current associated with electrode tips 302a and 303a and the tunnel current associated with electrode tips 302b and 303b (that is, the differential tunneling current) is a measure of the external applied angular acceleration. If the proof mass body 201 only accelerates linearly, any change in gap D1 likewise occurs in gap D2. Thus, the resulting difference of the associated tunneling currents is effectively suppressed.

FIG. 3B shows an exemplary application of the rotation-sensing in-plane tunneling current sensor arrangement 300 of FIG. 3A to measure the yaw rate of the proof mass 301. In particular, the following formulas demonstrate the relationship between the yaw rate $\Omega$ in a Z direction about a center O.

$$\Omega = |Aa - Ab|^{1/2}/L$$

$$Aa = (r+L)\Omega^2$$

$$Ab = r\Omega^2$$

where Aa represents the acceleration vector component at point A, Ab represents the acceleration vector component at point B, L represents the distance between point A and point B, and r represents the distance between the point B and the center of rotation O.

The rotation-sensing in-plane tunneling current sensor arrangement 300 of FIG. 3 may be combined with the two-dimensional in-plane tunneling sensor arrangement 200.

Figure 4:
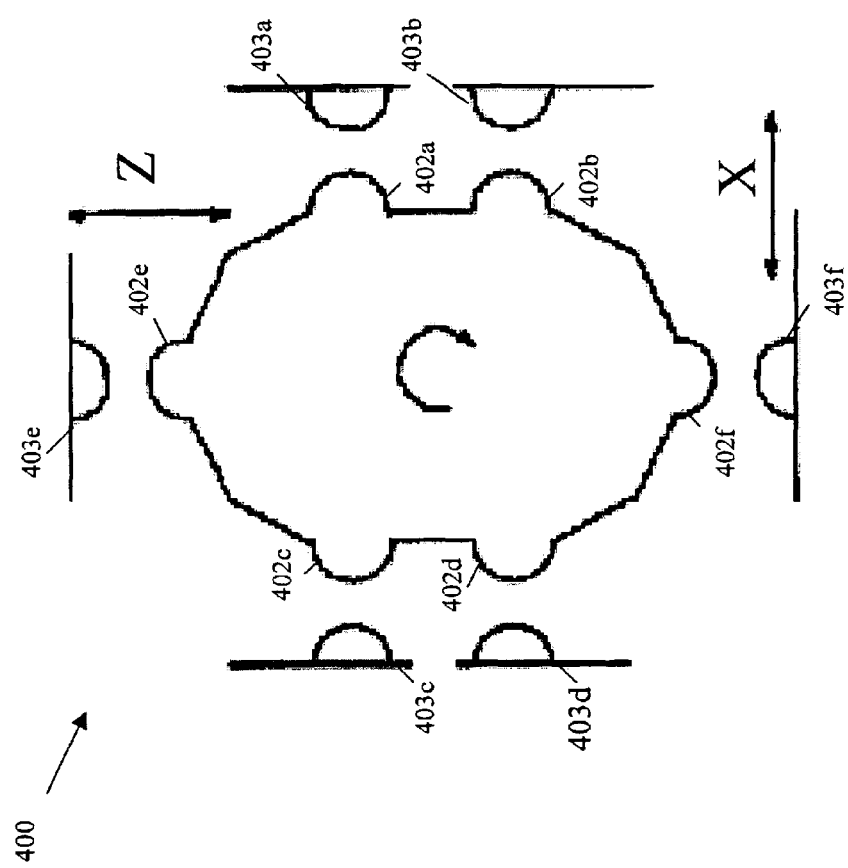
FIG. 4 shows an exemplary two-dimensional rotation-sensing in-plane tunneling current sensor arrangement.

FIG. 4 shows a two-dimensional rotation-sensing in-plane tunneling current sensor arrangement 400 for measuring both a two-dimensional linear and an angular acceleration of a proof mass 401. The two-dimensional rotation-sensing in-plane tunneling sensor arrangement includes a proof mass body 401, six integrated electrode tips 402a–f, and six surrounding external electrode tips 403a–f. The six integrated electrode tips 402a–f are arranged to be integrated with the proof mass body 401 and face either opposite or parallel to each other. In particular, integrated electrode tip 402a is arranged to be opposite integrated electrode tip 402c and parallel to integrated electrode tip 402b; integrated electrode tip 402b is arranged to be opposite integrated electrode tip 402d and parallel to integrated electrode tip 402a; integrated electrode tip 402c is arranged to be opposite integrated electrode tip 402a and parallel to integrated electrode tip 402d; integrated electrode tip 402d is arranged to be opposite integrated electrode tip 402b and parallel to integrated electrode tip 402c; and integrated electrode tip 402e is arranged to be opposite integrated electrode tip 402f.

The six surrounding external electrode tips 403a–f are arranged externally to the proof mass body 401 and in close proximity to the integrated electrode tips 402a–f. In particular, external electrode tip 403a is arranged to be in close proximity to integrated electrode tip 402a; external electrode tip 403b is arranged to be in close proximity to integrated electrode tip 402b; external electrode tip 403c is arranged to be in close proximity to integrated electrode tip 402c; external electrode tip 403d is arranged to be in close proximity to integrated electrode tip 402d; external electrode tip 403e is arranged to be in close proximity to integrated electrode tip 402e; and external electrode tip 403f is arranged to be in close proximity to integrated electrode tip 402f.

High peaks of acceleration (such as, for example, due to external handling) may lead to "crashing" an electrode tip against an opposite electrode tip. This may result in a nonfunctional tunneling sensor.

Figure 5:
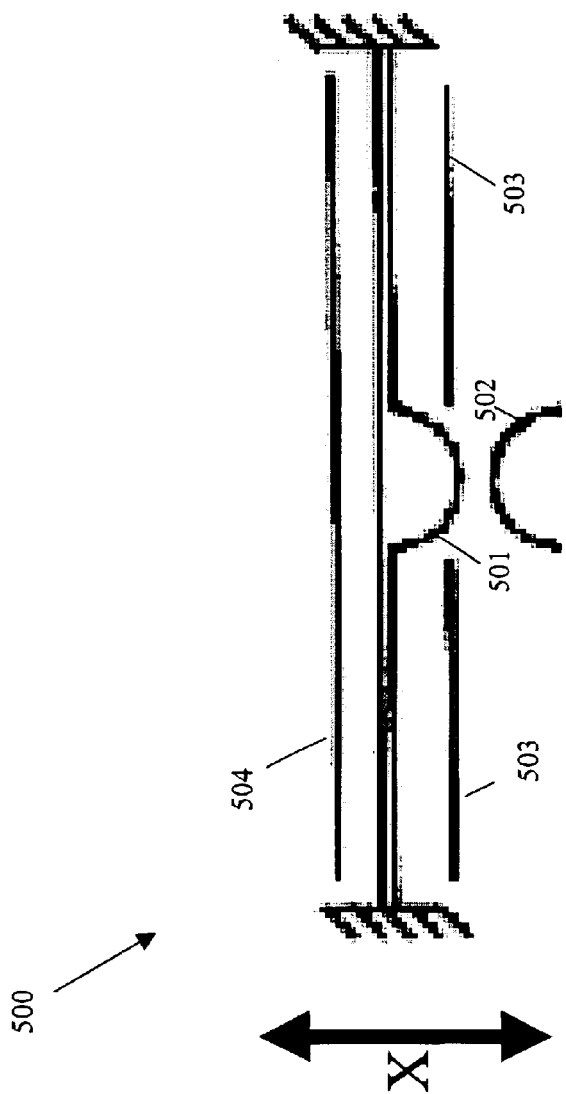
FIG. 5 shows an exemplary arrangement to protect electrode tips.

FIG. 5 shows an arrangement 500 to protect electrode tips using electrostatic actuators. Arrangement 500 includes two electrode tips 501 and 502 and two electrostatic actuators 503, 504. The two electrode tips 501 and 502 are arranged opposite each other and in close proximity. The electrostatic actuators 503, 504 are arranged to move electrode tip 501 in an X direction, either towards or away from electrode tip 502. In particular, actuator 503 is arranged to move electrode tip 501 in an X direction toward electrode tip 502, and actuator 504 is arranged to move electrode tip 501 in an X direction away from electrode tip 502.

During operation, actuator 503 moves electrode tip 501 towards electrode tip 502 in an X direction. To prevent an impending collision of the electrode tips 501, 502, actuator 504 pulls electrode tip 501 away from the approaching electrode tip 502. A fast electronic circuit may be used to determine if an impending collision is imminent by detecting a sudden increase in tunneling current flowing between the electrode tips 501, 502. If the circuit and actuators 503, 504 are fast enough, a near constant distance may be maintained between the electrode tips 510 and 502. In this manner, a device (such as, for example, a tunneling current sensor) using such an arrangement 500 may remain operational despite a requirement that a small gap be maintained between the electrode tips 501, 502.

What is claimed is:

1. A sensor arrangement for measuring a displacement of a proof mass using a tunneling current, comprising:
    a proof mass body suspended by micro-mechanical beams to permit a mass body movement;
    at least two integrated electrode tips arranged to be integrated with the proof mass body; and
    at least two external electrode tips arranged externally to the proof mass body and suspended by micro-mechanical beams to permit an external electrode movement, the at least two external electrode tips further arranged to be in a close proximity to the at least two integrated electrode tips to permit a flow of the tunneling current between the at least two external electrode tips and the at least two integrated electrode tips, wherein the displacement of the proof mass causes a change in the tunneling current.

2. The sensor arrangement of claim 1, wherein the at least two integrated electrode tips and the at least two external electrode tips are arranged to be an in-plane configuration.

3. The sensor arrangement of claim 1, wherein the proof mass body, the at least two integrated electrode tips, and at least two external electrode tips are in one structural layer of a microelectromechanical device.

4. The sensor arrangement of claim 1, wherein the displacement results from a linear acceleration.

5. The sensor arrangement of claim 1, wherein the displacement results from an angular acceleration.

6. The sensor arrangement of claim 1, wherein the displacement results from both a linear and an angular acceleration.

7. The sensor arrangement of claim 1, wherein the sensor arrangement is configured to measure a yaw rate.

8. The sensor arrangement of claim 1, further comprising:
    an arrangement to generate a force in response to a change in flow of the tunneling current to prevent a movement of the mass body.

9. The sensor arrangement of claim 1, further comprising:
    an arrangement to generate a force in response to a change in flow of the tunneling current to prevent a movement of the external electrode.

10. The sensor arrangement of claim 1, further comprising:
 a feedback arrangement to maintain a constant gap between at least one integrated electrode tip and at least one external electrode tip.

11. The sensor arrangement of claim 1, further comprising:
 at least one amplifier coupled to at least one external electrode tip.

12. The sensor arrangement of claim 1, further comprising:
 a dc supply coupled to the proof mass body.

13. The sensor arrangement of claim 1, wherein the micro-mechanical beams include at least two micro-mechanical beams that are arranged parallel to each other.

14. The sensor arrangement of claim 1, wherein the micro-mechanical beams include at least two micro-mechanical beams that are arranged co-linearly with each other.

15. The sensor arrangement of claim 1, wherein the at least two integrated electrode tips, the at least two external electrode tips, the proof mass body, and the micro-mechanical beams are in one structural layer of a micro-mechanical device.

16. A sensor arrangement for measuring a displacement of a proof mass using a tunneling current, comprising:
 a proof mass body suspended by a micromechanical beam arrangement to permit a mass body movement;
 at least one integrated electrode tip arranged to be integrated with the proof mass body; and
 at least one external electrode tip arranged externally to the proof mass body and suspended by micro-mechanical beams to permit an external electrode movement, the at least one external electrode tip further arranged to be in a close proximity to the at least one integrated electrode tip to permit a flow of the tunneling current between the at least one external electrode tip and the at least one integrated electrode tip, wherein the displacement of the proof mass causes a change in the tunneling current.
 wherein the at least one integrated electrode tip includes a first integrated tip and a second integrated tip, and the at least one external electrode tip includes a first external tip arranged in close proximity to the first integrated tip and a second external tip arranged in close proximity to the second integrated tip.

17. The sensor arrangement of claim 16, wherein the first integrated tip is arranged opposite to the second integrated tip.

18. The sensor arrangement of claim 16, wherein the first integrated tip is arranged parallel to the second integrated tip.

19. The sensor arrangement of claim 16, wherein the at least two integrated electrode tips further include a third integrated tip and a fourth integrated tip, and the at least two external electrode tips further include a third external tip arranged in close proximity to the third integrated tip and a fourth external tip arranged in close proximity to the fourth integrated tip.

20. The sensor arrangement of claim 19, wherein the first integrated tip is arranged opposite to the second integrated tip and the third integrated tip is arranged opposite to the fourth integrated tip.

21. The sensor arrangement of claim 19, wherein the at least two integrated electrode tips further include a fifth integrated tip and a sixth integrated tip, and the at least two external electrode tips further include fifth external tip arranged in close proximity to the fifth integrated tip and a sixth external tip arranged in close proximity to the sixth integrated tip.

22. The sensor arrangement of claim 21, wherein the first integrated tip is arranged opposite to the second integrated tip and parallel to the third integrated tip, the third integrated tip is arranged opposite to the fourth integrated tip and parallel to the second integrated tip, and the fifth integrated tip is arranged opposite to the sixth integrated tip.

* * * * *